(No Model.)

C. SCHOFIELD.
PLUMB LEVEL.

No. 320,506. Patented June 23, 1885.

Witnesses:
Robt E. Kaekler
C. J. Rockwood

Inventor
Charles Schofield
By P. H. Gunckel
Attorney

UNITED STATES PATENT OFFICE.

CHARLES SCHOFIELD, OF MINNEAPOLIS, MINNESOTA.

PLUMB-LEVEL.

SPECIFICATION forming part of Letters Patent No. 320,506, dated June 23, 1885.

Application filed February 3, 1885. (No model.)

*To all whom it may concern:*

Be it known that I, CHARLES SCHOFIELD, a citizen of the United States, and residing at Minneapolis, in the county of Hennepin and State of Minnesota, have invented a certain new and useful Improvement in Plumb-Levels, of which the following is a specification.

My invention relates to improvements in the construction of weighted pointers for plumb-levels.

Figure 1:
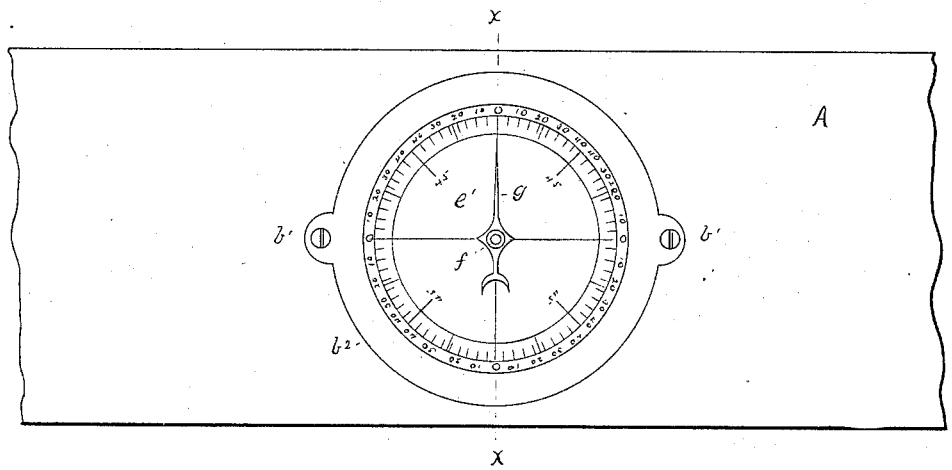
Figure 2:
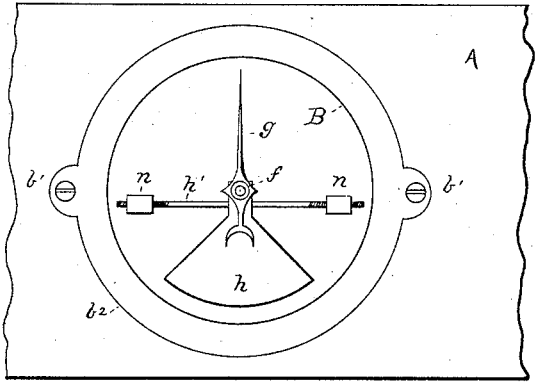
Figure 3:
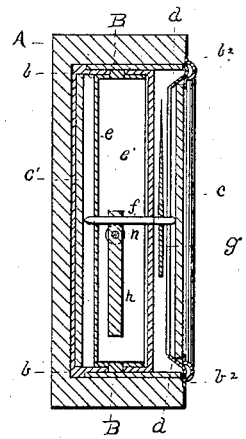

In the drawings, Figure 1 is a front view of a portion of a level provided with my improvement. Fig. 2 is the same view with the graduated disk removed, and Fig. 3 is a sectional view on the line $x\ x$ of Fig. 1.

A represents a portion of a level.

B is a cylindrical metal casing containing the operative parts of the device, and is designed to be let into a recess in the level or other instrument, and fastened by screws through the ears $b'$ on the flange $b^2$ of the casing.

$b$ is a detachable back secured by a rim sliding within the case B.

$c$ is a glass front, secured under the inner edge of the case-flange $b^2$ by a collar, $d$. The flange and collar being brazed to the case, the glass is firmly held in place.

$c'$ is a glass back, secured on the back $b$, to supply an end bearing for the pointer-pivot.

$e$ is a cylindrical cup sliding within the case B, and has a cap, $e'$, on which cap or disk are suitable graduations, which may be any desirable subdivisions of a circle.

$f$ is a pintle or pointer-pivot passing through holes in the base of the cup $e$ and disk $e'$. The pintle fits loosely in these holes, so that when the case is tipped backward or forward the pintle may slide in the holes or bearings, and have an end bearing on the glass $c'$ or $c$. If desired, the pintle may be made to extend from the one glass to the other, and thus bear against both. In either case it will turn freely and render the instrument capable of effective use even when not held in exact vertical position.

$g$ is a pointer attached to the pintle between the glass $c$ and disk $e'$.

$h$ is a weight attached to the pintle, under the pointer and between the bottom of the case $e$ and its cap $e'$, and a rod, $h'$, (or separate rods or pins,) threaded at the extended ends, and provided with nuts $n$, is attached to the weight $g$, to regulate the weight relatively to the pointer. By adjustment of the nuts any variation of the pointer from a true vertical position can be corrected.

Having fully described my invention, what I claim, and desire to secure by Letters Patent, is—

1. The combination, with a case having a glass front and glass on its back, of an interior cup bearing a graduated disk, a pintle having bearings in said cup and disk, and an end bearing on one or both of said glasses, a pointer and a weight attached to said pintle, the said weight being provided with a threaded rod or pins having adjustable nuts thereon, substantially as and for the purpose set forth.

2. The combination, with a suitable case, having front and back glasses, of a graduated disk, a pivot-pin having its bearings substantially as described, and carrying the pointer $g$, weight $h$, rod $h'$, and nuts $n$, when constructed and arranged substantially as described.

CHARLES SCHOFIELD.

Witnesses:
PATRICK H. GUNCKEL,
FRED W. COOLEY.